Figure 1:
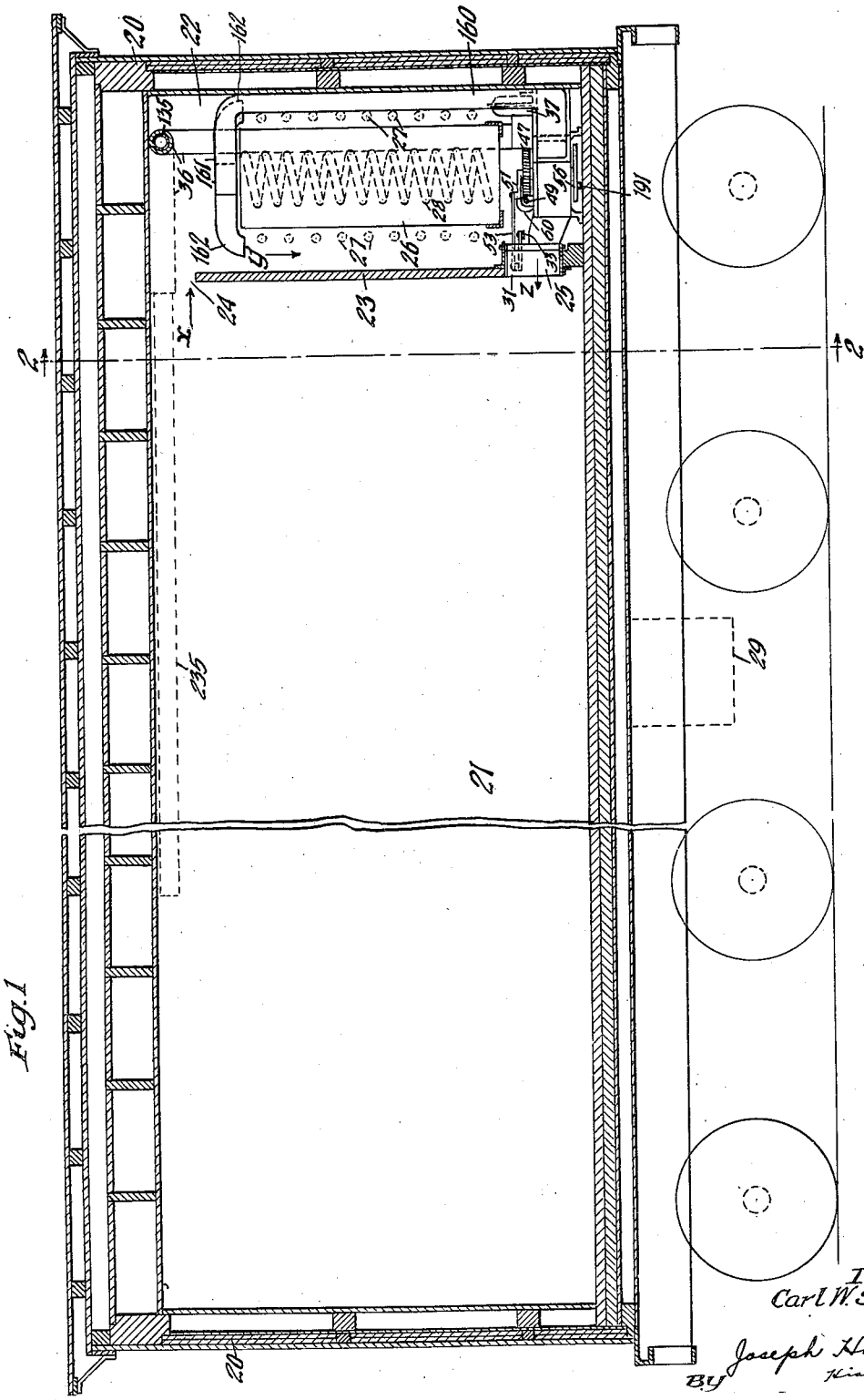

Oct. 9, 1934.　　　　C. W. SPOHR　　　　1,975,875
TEMPERATURE CONTROLLED CAR
Filed June 2, 1932　　　5 Sheets-Sheet 1

Inventor
Carl W. Spohr
By Joseph Harris
his Atty.

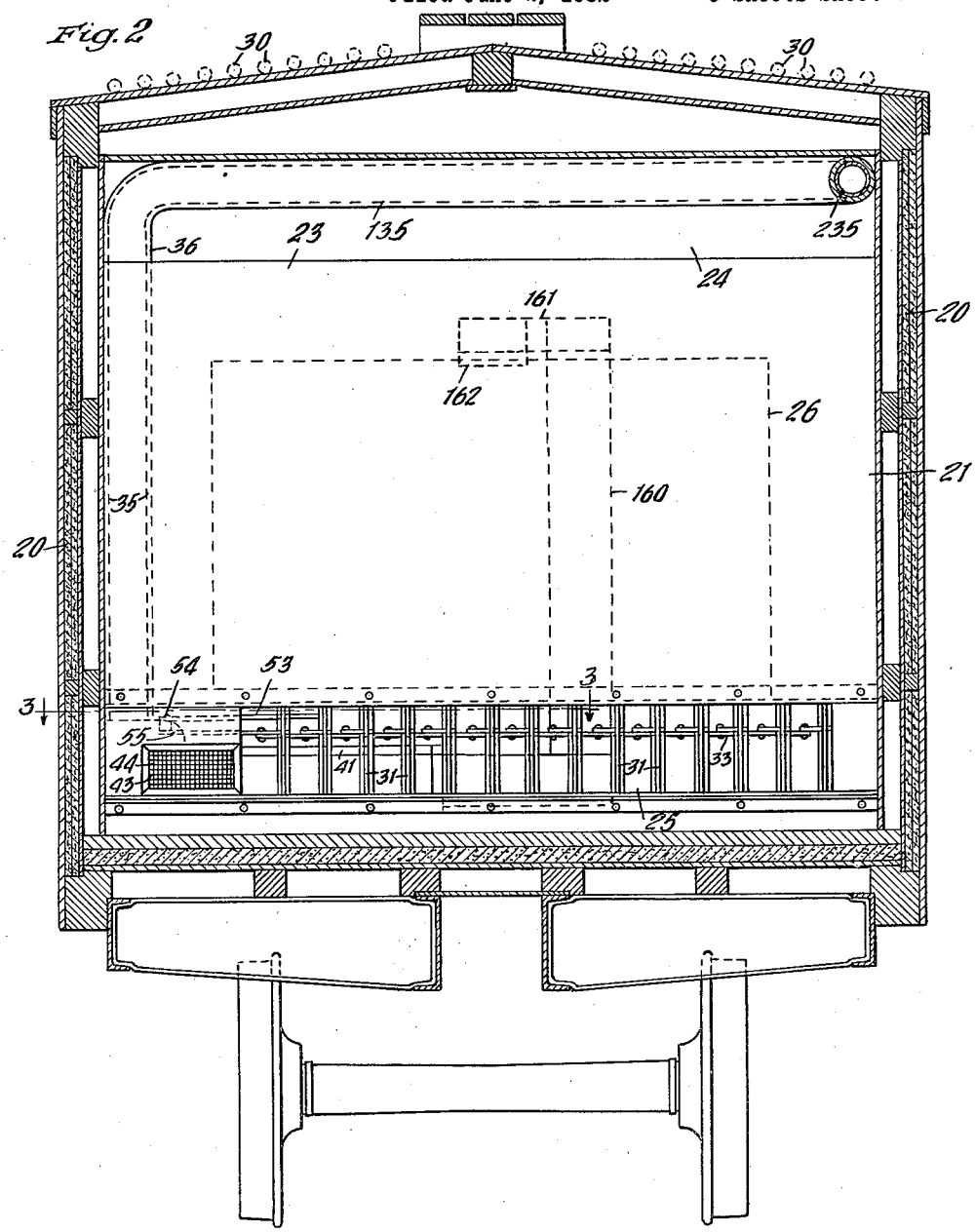

Oct. 9, 1934.  C. W. SPOHR  1,975,875
TEMPERATURE CONTROLLED CAR
Filed June 2, 1932  5 Sheets-Sheet 3
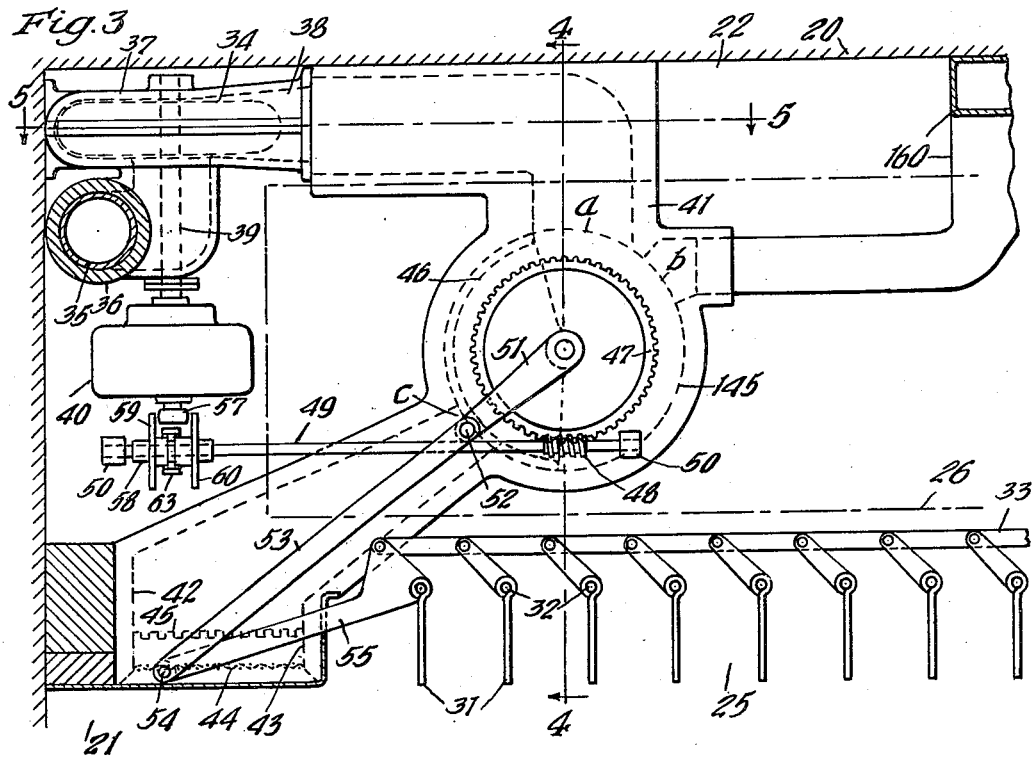
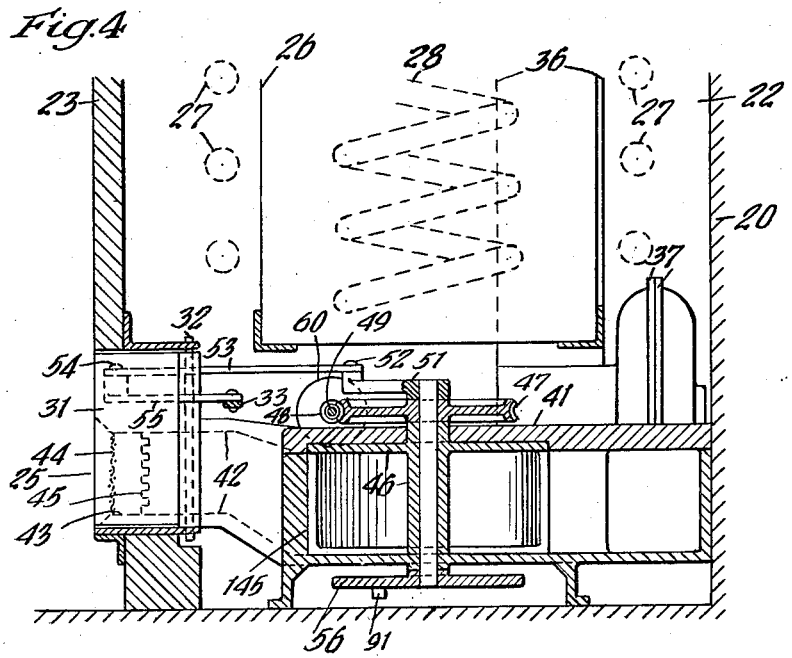
Inventor
Carl W. Spohr
By Joseph Harris
His Atty.

Oct. 9, 1934.  C. W. SPOHR  1,975,875
TEMPERATURE CONTROLLED CAR
Filed June 2, 1932  5 Sheets-Sheet 4

Inventor
Carl W. Spohr
By Joseph Harris
his Atty.

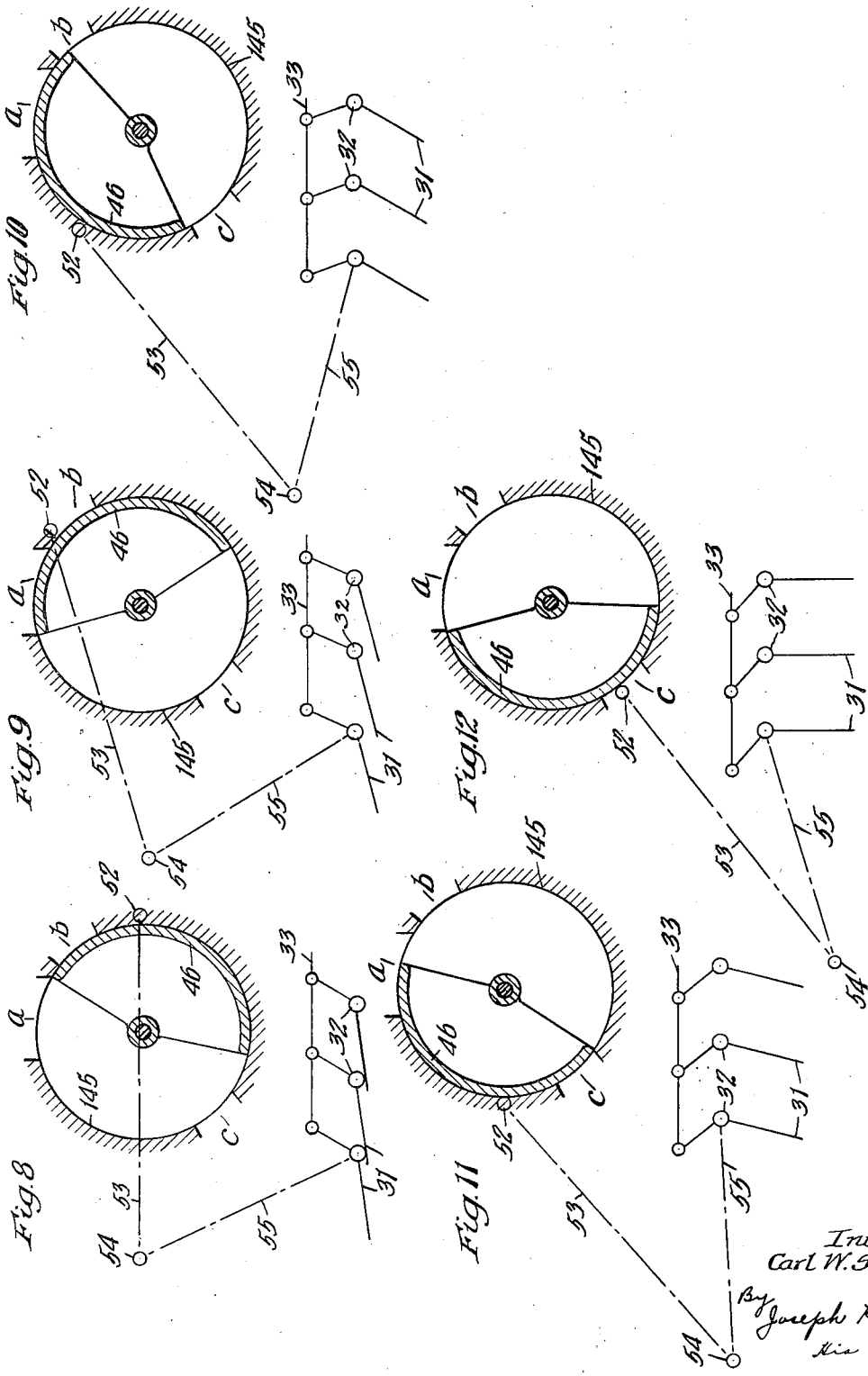

Patented Oct. 9, 1934

1,975,875

UNITED STATES PATENT OFFICE 1,975,875

TEMPERATURE CONTROLLED CAR

Carl W. Spohr, Chicago, Ill., assignor to Mechanical Refrigerated Car Company, Chicago, Ill., a corporation of Illinois Application June 2, 1932, Serial No. 614,883

10 Claims. (Cl. 257—7)

This invention relates to improvements in temperature controlled cars, especially but not exclusively intended for so-called refrigerator freight cars.

In the operation of refrigerator cars, it is well known that such cars encounter extreme conditions of hot and cold outside temperatures in traveling from one part of the country to another with the result that more refrigeration is required during some portions of the journey than at others and, under certain conditions of extreme cold, a certain amount of heat is found desirable to compensate for the heat losses to atmosphere.

One object of this invention is to provide means for controlling the temperature of a payload or other revenue producing compartment of a vehicle under all varying conditions of service so as to maintain the temperature of said compartment within predetermined maximum and minimum limits with co-related control of the circulating air currents.

Another object of the invention is to provide an arrangement of the character indicated in the preceding paragraph particularly adapted to refrigerator cars wherein the refrigeration is produced mechanically by power derived from the car axle.

Another object of the invention is to provide a temperature controlled arrangement of the character above indicated wherein forced air draft and gravity air draft are utilized in connection with means for heating the air, the arrangement being characterized by the fact that when a supply of heat to the air is necessary, circulation of any air currents past the refrigerating apparatus is shut off and when maximum refrigeration is desired, the air is forced over and around the refrigerating apparatus so as to obtain the maximum cooling effect, with varying combinations of the air circulation for conditions intermediate the maxmum heating and maximum refrigerating requirements.

Another object of the invention is to provide, in a refrigerator car, a chamber for the control apparatus which is separated from the payload compartment with temperature responsive means for controlling the air circulation and heating when required under all the variable conditions between maximum heating requirements and maximum refrigerating requirements.

Other objects of the invention will more clearly appear from the description and claims hereinafter following.

Figure 5:
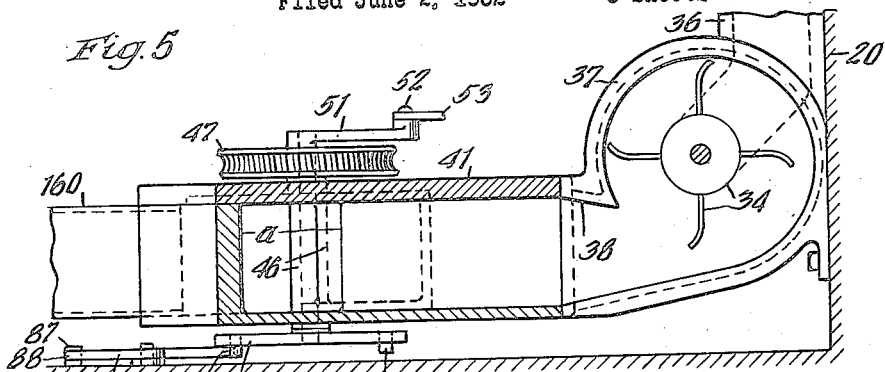
Figure 6:
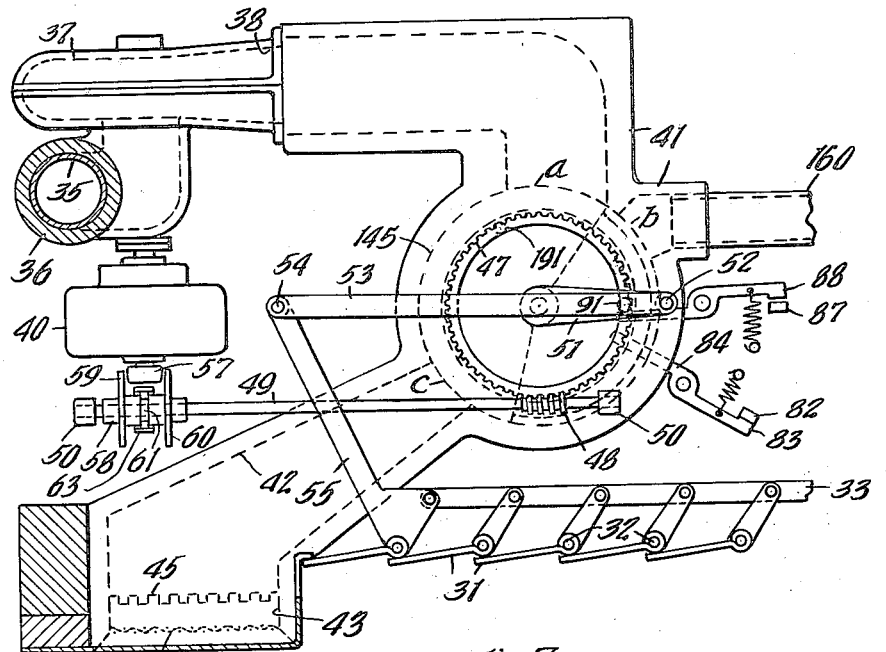
Figure 7:
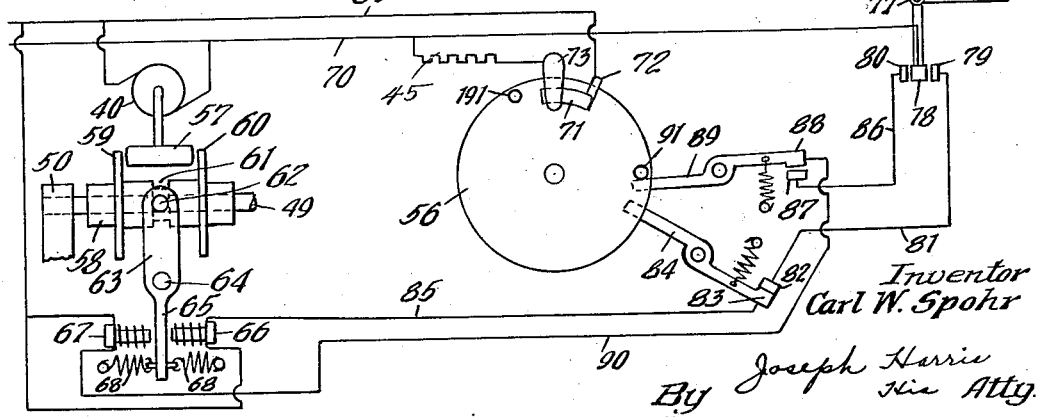

In the drawings forming a part of this specification, Figure 1 is a vertical, longitudinal, sectional view of a refrigerator car showing the improvements incorporated therein, central portions of the car being broken away in order to better accommodate the figure on the sheet. Figure 2 is a vertical, transverse, sectional view of the car shown in Figure 1 and corresponding substantially to the line 2—2 thereof. Figure 3 is a horizontal, sectional view upon an enlarged scale, corresponding substantially to the line 3—3 of Figure 2. Figure 4 is a vertical, sectional view, corresponding substantially to the line 4—4 of Figure 3. Figure 5 is a vertical, sectional view, corresponding substantially to the line 5—5 of Figure 3. Figure 6 is a view similar to Figure 3 but illustrating a different position of certain of the parts. Figure 7 is a diagrammatic view illustrating more particularly the control means and associated electrical circuits. And Figures 8 to 12 are diagrammatic views illustrating five different positions of the air draft control valve and associated louvers governing one of the openings for the air between the refrigerating chamber and payload compartment.

In said drawings, 20 designates generally the insulated body of a refrigerator car mounted on trucks in the usual manner, the interior of the car being divided into a payload or other revenue producing compartment 21 and a refrigerating chamber 22 by means of a partition or bulkhead 23, which extends the full width of the car and is of such a height as to leave an opening 24 at the top and an opening 25 at the bottom for air circulation, as hereinafter described. Within the refrigerating chamber is disposed a brine tank 26 on the exterior of which are disposed refrigerating coils 27—27 and on the interior of which is disposed another refrigerating coil 28. The compressor for the refrigerating apparatus will preferably be located in a box or casing 29 secured to the underside of the car body adjacent one of the trucks, said compressor being driven by any suitable means from the adjacent car axle. The refrigerant will be passed from the compressor to condenser coils located preferably on the roof of the car, as indicated at 30 in Figure 2, the condensed refrigerant then being collected in a suitable receiver, not shown, and thence passed preferably through the two outside series of coils 27—27 in parallel and thence in series through the inner coil 28 and back to the compressor. It is deemed unnecessary to illustrate in detail the compressor, condenser, expander refrigerating system since this may be of any desired suitable arrangement, such as disclosed, for instance, in the Luhr Reissue Patent No. 17,660, granted May 13, 1930, and in the Luhr application, Serial No. 413,713, filed December 13, 1929, now Patent No. 1,958,794 issued May 15, 1934, and to which reference may be had for a more complete disclosure of specific details.

The lower outlet or egress opening 25 from the refrigerating chamber 22 to the compartment 21, is controlled by a series of louvers 31—31 pivoted about vertical axes 32—32, all of said louvers being connected so as to be simultaneously operated by means of a connecting link 33. In one position of the louvers, as shown in Figure 6, it is obvious that said egress opening 25 is entirely closed and in another position, as shown in Figure 3, the louvers are wide open, thereby permitting maximum passage of air to the compartment 21.

Located within the chamber 22, preferably as shown best in Figure 3, is an air fan 34 having a vertically extending air inlet pipe 35, which is extended upwardly to a point above the bulkhead 23, thence preferably crosswise of the car, as indicated at 135, and thence lengthwise of the car along the upper corner, as indicated at 235, to a point near the opposite end of the payload compartment, as shown in Figure 1. The inlet pipe 35 may be covered with suitable insulation 36 on those portions thereof within and immediately above the refrigerating chamber 22 so as to minimize transfer of heat. The fan or rotor 34 proper is suitably mounted in a casing 37 of more or less convolute form, the same having a delivery port 38 therefrom, as best indicated in Figure 5. The fan proper or rotor is keyed to a shaft 39 mounted in suitable bearings and extended outwardly of the casing 37 where it is adapted to be directly driven by an electric motor 40. Current for the motor 40 may be obtained from any suitable source of supply as, for instance, a generator directly driven by one of the car axles as shown in said Luhr application, Serial No. 413,713, and for carry over purposes when the car is standing idle during transit, a suitable storage battery may be employed, if desired. The details of the source of electrical current supply are deemed unnecessary since these may be varied and the specific construction forms no part of this invention.

The forced draft of air passing through the fan arrangement is delivered from the opening 38 thereof to a valve control casing 41, having an inlet opening *a* and two outlet openings *b—c*. The outlet port *b* is in communication with and delivers the forced draft of air to a pipe 160 which extends first vertically upwardly along the rear side of the tank and coils to a point above the top thereof where it is then extended over the top of the tank, as indicated at 161, the latter pipe then connecting with two oppositely extending delivery pipes or hoods 162—162, at each side of the tank and coils at the top thereof in such manner as to direct the forced draft of air downwardly over the outer coils and alongside the tank, for the purposes hereinafter described. The valve delivery port *c* is extended to provide an elongated, gradually enlarged opening 42, ending in a delivery opening or egress port 43 direct to the payload compartment 21. Said egress opening 43 preferably has a wire mesh screen 44 thereover to prevent admission of foreign matter into the passage 42, as will be understood. Also disposed within said egress opening 43 inwardly of the screen 44 is an electrical heating coil grid or resistance 45 of any suitable or desired construction so that when said heating element is heated and air is being passed to the compartment 21 through the opening 43, it will be heated in passing the grid resistance, as will be understood.

The valve casing 41 has a circular valve chamber 145 within which is rotatable about a vertical axis, a control valve 46 of approximately 180° extent, as best shown in Figures 8 to 12. A shaft fixed with respect to said valve is extended both upwardly and downwardly beyond the top and bottom walls of the casing, respectively, as best shown in Figure 4, and to the upper extended end is fixed a worm gear 47 with which cooperates a worm 48 carried by a horizontally and transversely extending shaft 49 journaled at its ends in suitable bearings 50—50. Rotation of the worm 48 will effect rotation of the valve 46, as will be evident.

Also secured to the upper extended end of the valve shaft is a crank arm 51 pivotally connected at 52 to a link 53, which in turn is pivotally connected at 54 to an extended arm 55 rigid with the end louver 31 so that, as the valve 46 is shifted from one position to another, there will be a co-related movement or adjustment of the louvers 31.

Secured to the lower end of the valve shaft, as shown in Figures 4 and 5, is a control disc 56, the function of which will be described more in detail hereinafter.

The worm shaft 49 is adapted to be rotated at the proper time and in the proper direction by the following means, particular reference being had to Figures 6 and 7. The armature shaft 110 of the motor 40 is extended toward the shaft 49 and has secured thereto a friction pulley 57. Slidably keyed to the shaft 49 is a sleeve 58 carrying two friction discs 59 and 60, both normally slightly spaced from the surface of the pulley 57, as clearly shown. The sleeve 58 is provided with an annular groove 61, in which work diametrically disposed pins 62 carried by a shipper lever 63, pivoted at 64, and having an armature arm 65 disposed between two magnets 66 and 67, the shipper lever 63 being normally held in central position, as shown, by two oppositely disposed springs 68—68. When the magnet 66 is energized, as hereinafter described, it is evident that the armature end 65 of the shipper lever will be drawn thereagainst, thus moving the sleeve 58 toward the left, as viewed in Figures 6 and 7 and placing the friction wheel 60 in contact with the friction pulley 57 and thus imparting rotation to the shaft 49 in one direction. Similarly, when the other magnet 67 is energized, the sleeve 58 will be shifted toward the right and the friction disc 59 brought in contact with the friction pulley 57 so as to impart rotation in the opposite direction to the shaft 49. By suitably proportioning the diameters of the pulley 57, discs 59 and 60 and by utilizing a shallow pitch on the worm 48, the speed of movement of the valve 46 can be made as slow as desired, as will be evident.

Referring next to the electrical circuits and controlling devices governing the operation of the valve, particular reference being had to Figure 7, 69 and 70 indicate the main supply wires. On the underside of the control disc 56, which will preferably be of insulating material, is a short arcuate contact 71 which, when the disc 56 is in the position shown in Figure 7, completes the circuit for the heating element 45 through the stationary contacts 72 and 73. This position corresponds to the position of the valve and louvers shown in Figure 6, at which time the forced draft of air is being delivered through the egress opening 43 and heated, no circulation of air being permitted through the louver controlled egress opening 25. The electrical circuits are controlled by a thermostatic expansion bellows 74 located at any desired point within the compartment 21, the same being affixed to a bracket 75. The stem of the bellows carries a lever 76 pivoted at 77, the opposite end of the lever carrying a movable contact point 78 electrically connected to the main line wire 70, as shown. The contact 78 is normally out of contact with the two opposed stationary contacts 79 and 80. The contact 79 through conductor 81 runs to one pole 82 of a control switch, the other pole of which, 83, is carried by a spring influenced lever 84. From pole 83 runs a wire 85 to the magnet 66 and thence to the main line 69. The other thermostat contact 80, is connected through conductor 86 to a pole 87 of another switch, the other pole of which, 88, is carried by another spring controlled lever 89. From pole 88 conductor 90 runs to the magnet 67 and from the latter to the main line 69, as shown, to complete the circuit. Also carried by the control disc 56 on the underside thereof are lugs 91 and 191 so located as to travel in a path that they will respectively engage the inner ends of the levers 89 and 84.

In the position shown in Figure 7, as hereinbefore described, the heating element 45 is on and the louvers closed so that the maximum heating effect is obtained. As the temperature of the compartment 21 rises to a predetermined amount, the bellows 74 will expand, thus closing the contacts 78 and 79 and energizing the magnet 66, the switch 82—83 being then closed, as shown. This in turn induces a shift of the sleeve 58 and consequent rotation of the valve 46 in a counter clockwise direction. Rotation of the valve in turn induces rotation of the control disc 56 in a counter clockwise direction, thus releasing the lever 89 and permitting closure of the switch 87—88 and also breaking the circuit of the heating element 45 by moving the contact 71 out of contact with the contact point 72. Rotation of the valve 46 and control disc 56 counter clockwise will continue so long as the thermostat contacts 78 and 79 and the switch 82—83 are closed but all movement of the parts will immediately cease as soon as the temperature lowers sufficiently to open the contacts 78—79 or the switch 82—83 is opened as hereinafter described. Opening of the contacts 78 and 79 may occur at any point of rotation of the valve, as will be evident. Assuming the parts to have ceased movement at some intermediate point, the valve and control disc are then free to rotate either clockwise or counter clockwise, dependent upon the expansion or contraction of the bellows 74. If it be assumed that the thermostatic contact 78 and 79 open shortly after breaking of the heating circuit and thereafter the temperature increases sufficiently to again close the thermostat contacts 78 and 79, movement of the valve 46 and disc 56 will continue in the same direction until the contacts 78 and 79 again open or the switch 82—83 is opened. The maximum counter clockwise movement of the valve 46 and control disc 56 will result in the pin 191 coming into engagement with the inner end of the lever 84 and hence opening of the switch 82—83, which extreme condition represents the maximum requirements of refrigeration and correspondence to the position of the valve and louvers best shown in Figure 12 and to which reference will be had hereinafter. At any intermediate point between that shown in Figure 7 and the maximum movement just referred to, it is evident that the valve 46 and control disc 56 may be rotated clockwise the desired amount in the event the thermostat contact 78 moves in the opposite direction so as to effect contact with the stationary contact 80, in which event the circuit is completed through 78—80; 87—88, (previously closed by release of lever 89); and thence through the magnet 67 back to the line 69. With the arrangement just described, it is evident that a very accurate and close control of the movements of the valve 46 and control disc 56 may be effected, and all of which are responsive to the temperature within the compartment 21. At any intermediate position of the control disc 56, the latter may be operated in either direction as conditions may require but, in either extreme position of the control disc 56, the latter can only be operated in one direction therefrom.

Referring now more particularly to Figures 8 and 12, Figure 8 discloses the position of the valve 46 when the maximum heating is required, that is, the forced draft of air entering the valve chamber through $a$ is delivered entirely through the opening $c$ and hence past the heating element. In this connection, it will be noted that the louvers are closed and hence no air circulates past the refrigerating means.

In Figure 9, the valve has been turned approximately 45° as shown by the pivot point 52 wherein all forced draft circulation is shut off and at the same time the heating element 45 will be cut out. The louvers 31 are slightly open so that air circulating under gravity may be delivered under quite restricted conditions from the refrigerating chamber to the compartment 21. In this connection, it will be understood that air will, unless otherwise controlled, circulate normally in the direction of the arrows $x$, $y$ and $z$, as shown in Figure 1, that is, the air in the compartment 21, which has been heated to a certain extent, will enter through the ingress opening 24 to the chamber 22; will gradually drop down under the influence of gravity as it is cooled by the refrigerating means and will be delivered from the chamber 22 to the compartment 21 through the egress opening 25.

In Figure 10, the passage for the forced draft of air is still shut off but the louvers 31 are farther opened so as to permit a more free and greater circulation of air moving under gravity influence, which enters at 24, passes downwardly over the tank and coils and is delivered to the chamber 21 through the egress opening 25.

In Figure 11, the delivery port $c$ of the valve casing is closed, the port $b$ open and the inlet port $a$ partially uncovered and, at the same time, the louvers 31 are still farther opened. In this condition of the parts, a restricted amount of forced draft air is delivered over the top of the refrigerating means to mingle with and flow in consonance with the gravity moving air to thereby obtain an accelerated refrigerating action, as will be evident.

In Figure 12, the inlet port $a$ is fully uncovered, the outlet port $c$ covered and the outlet port $b$ fully open so that the maximum current of forced draft air is delivered over the top of the refrigerating means and at the same time the louvers 31 are in their maximum open position, as shown. In this condition of the parts, the greatest amount of cold is extracted from the refrigerating means and the maximum volume of air circulation obtained so as to produce the quickest rate of cooling possible.

In connection with the preceding description of the operation, it will be noted that when the temperature of the pay load compartment is below the desired minimum and heating or at least no additional refrigeration is required, the louvers are closed and hence should the current supply fail or be cut off at such time, the best conditions possible will obtain since there can be no air circulation, or substantially none. On the contrary, should there be a failure or shutting off of the current for operating the fan when the temperature of the compartment is above a predetermined maximum as represented by Figure 12, nevertheless the best conditions obtain for this situation since the louvers 31 are in their opened condition and maximum circulation of air under gravity can at least take place with continued abstraction of cold from the refrigerating apparatus, it being understood, in this connection, that the brine tank is utilized as a cold accumulator to be availed of even when the car is not running, as set forth in said prior Luhr patents.

From the preceding description, it will be seen that, under one extreme condition, all the circulated air which is under forced draft, is heated, and under the opposite extreme condition all of the circulated air which combines the gravity and forced drafts is refrigerated with graduated modifications of the tempering of the air and control of the drafts between the two extremes so as to produce an exceedingly sensitive control of the temperature in the pay load compartment.

In the drawings, only one refrigerating chamber has been shown but, as will be obvious, the refrigerating chamber and associated parts may be duplicated at both ends of the car when utilized in a refrigerator car. Furthermore, while the invention has been described with particular reference to a refrigerator car, nevertheless it is obvious that many of the important features of the invention may be utilized in other vehicles as, for instance, sleeping cars and dining cars. Various changes with respect to the inter-related air currents, control valve, louvers and cutting in and out of the heating element will also readily suggest themselves to those skilled in the art. All changes, modifications and adaptations of the invention are contemplated that come within the scope of the claims appended hereto.

What is claimed is:

1. In a vehicle having a temperature controlling chamber and a temperature controlled compartment, the combination with separate forced draft and gravity draft air inlets from the compartment to the chamber; of refrigerating means in said chamber; two air outlet passages from the chamber to the compartment; and temperature responsive means for selectively directing the air admitted under forced draft to the chamber through either of said outlet passages.

2. In a railway car having a temperature controlling chamber and a temperature controlled compartment, the combination with refrigerating means in said chamber; of means including a conduit and a fan for withdrawing air always in the same direction of flow through the conduit from the compartment, said conduit having one outlet opening into the chamber and another opening into the compartment; and temperature responsive means selectively controlling delivery of the air through either of said outlets.

3. In a railway car having a refrigerating chamber and a temperature controlled compartment, the combination with passages between said chamber and compartment for ingress of air to the chamber and egress therefrom circulating under gravity; of passages for ingress of air to and egress from the chamber under forced draft; devices for opening and closing one of said gravity passages; and means for selectively controlling the delivery of the forced draft of air to either said compartment directly or to said chamber.

4. In a railway car having a refrigerating chamber and a temperature controlled compartment, the combination with passages between said chamber and compartment for ingress of air to the chamber and egress therefrom circulating under gravity; of passages for ingress of air to and egress from the chamber under forced draft; devices for opening and closing one of said gravity passages; and means for selectively controlling the delivery of the forced draft of air to either said compartment directly or to said chamber, said devices and means being inter-connected.

5. In a railway car having a chamber with refrigerating means therein and a temperature controlled compartment, the combination with openings for the ingress of air to the chamber and egress therefrom to the compartment when the air is circulating under gravity; of means for delivering a forced draft of air from the compartment to the chamber; devices for closing and opening said egress opening; and means for directing the forced draft of air downwardly over the refrigerating means when said egress opening is open.

6. In a railway car having a compartment, apparatus for tempering air circulating therein, said apparatus including: air cooling means; means for producing a forced draft of air including a valve chamber having an inlet and two outlet ports, and a valve cooperable therewith; a louver controlled passage between said cooling means and the compartment; and connections between said louvers and valve so arranged that when the valve is positioned to deliver forced draft air through one of said outlet ports, the louvers are opened and when positioned to deliver the air through the other outlet port the louvers are closed.

7. In a railway car having a compartment, the air of which is to be tempered, the combination with an air tempering chamber having cooling means therein; of passages between said compartment and chamber for effecting a gravity circulation of air therebetween; means for shutting off said circulation of air; means for withdrawing air under forced draft from the compartment; means for discharging the forced draft of air either to said chamber or directly back to the compartment including a control valve; and operative connections between said last named means and said means for shutting off said gravity circulation of air.

8. A refrigerator car having a pay load compartment and a cooling chamber separated by a partition with upper and lower passages for gravity circulation of air; means for closing one of said passages; refrigerating means in said chamber; an air fan system for forcibly withdrawing air from the compartment; a valved distributor operatively associated with said fan system for selectively delivering the air therefrom either through one passage directly back to the compartment or to the chamber for contact with the refrigerating means; inter-connections between said valve and closure means for synchronous operation thereof; means for heating the fan actuated air when being directly delivered to the compartment; and temperature responsive means governing the operation and position of said valve and connected closure means.

9. A refrigerator car in accordance with claim 8 wherein the heating means comprises an electric heating element included in an electric circuit with a control switch the latter being closed when said closure means are in closed position.

10. In a railway car having a compartment, the air of which is to be tempered, the combination with an air tempering chamber having cooling means therein; of a passage between said compartment and chamber; valve means controlling said passage; means for producing a forced draft of air including a valve chamber having an inlet and two outlet ports and a valve cooperable therewith; and connections between said last named valve and first named valve means so arranged that when the valve in the chamber is positioned to deliver forced draft air through one of said outlet ports, said valve means are opened and, when said chamber valve is positioned to deliver air through the other outlet port, said valve means are closed.

CARL W. SPOHR.